United States Patent [19]

Massie

[11] Patent Number: 4,970,808
[45] Date of Patent: Nov. 20, 1990

[54] ELECTRO-ACOUSTICAL FISHING LURE

[76] Inventor: Lewis E. Massie, 2218-13th St., Olivenhain, Calif. 92024

[21] Appl. No.: 502,876

[22] Filed: Apr. 2, 1990

[51] Int. Cl.⁵ .................................. A01K 79/02
[52] U.S. Cl. .......................... 43/17.1; 43/42.31
[58] Field of Search ........................ 43/17.1, 42.31

[56] References Cited

U.S. PATENT DOCUMENTS

| | | | |
|---|---|---|---|
| 1,830,080 | 11/1931 | Allen | 43/42.31 |
| 3,003,276 | 10/1961 | Patterson | 43/42.31 |
| 3,142,927 | 8/1964 | Stram | 43/42.31 |
| 3,363,358 | 1/1968 | Johansson | 43/42.31 |
| 3,693,279 | 9/1972 | Mackie | 43/42.31 |
| 4,163,338 | 8/1979 | Lucarini | 43/42.31 |
| 4,583,313 | 4/1986 | Dugan, Jr. | 43/17 |
| 4,625,447 | 12/1986 | Bucganan | 43/17 |

Primary Examiner—Richard K. Seidel
Assistant Examiner—Chuck Y. Mah
Attorney, Agent, or Firm—Lewis E. Massie

[57] ABSTRACT

The introduction of electrical pulses and sonic waves into the water habitat of fish is accomplished by suspending electrodes of different electrode potential attached to the fishing lure. The electrodes are configured to flutter when drawn through the water and the fluttering causing the electrodes to make momentary contact. The electrodes of different potential and the water as electrolyte constitute a voltaic cell which discharges an electrical current pulse when the electrodes make contact. The impact of the colliding electrodes simultaneously generates an acoustical wave into the water, it has been long known that electrical pulses and sonic waves attract fish.

2 Claims, 1 Drawing Sheet

ELECTRO-ACOUSTICAL FISHING LURE

BACKGROUND OF THE INVENTION

1Field of the Invention

Fish sense, and are attracted to, sources of electric fields and sonic fields in their water habitat. The stimulation of the fish nerve sensors has greater neurophysical effect to pulsed direct current. The optimal shape of the electric current pulse is a steep increase and a slow decrease. The optimal pulse frequency for electronarcosis and electrotaxis depends upon the species of fish. For trout this is between 50 and 100 pulses per second, for tuna the frequency is 7 to 20 pulses per second and for carp the frequency is 45 to 50 pulses per second.

Acoustical signals, attractive to fish, generated by piezoelectric transducers are generally below 20 kilohertz and by acoustical transducers 600 to 1000 Hz.

2. Description of the Related Art

U.S Pat. No. 4,625,447, 1986 Bachanan discloses a solar powered fishing lure wherein a solar cell located on the body receives sunlight and develops electrical power which is delivered in the form of electrical pulses and sonic pulses in the water.

U.S. Pat. No. 4,583,313, 1986 Dugan Jr., discloses a fishing lure containing a battery driven piezo-electric transducer emitting a predetermined frequency, or frequencies up to 100 kilohertz. The tones utilized generally fall below 20 kilohertz.

SUMMARY OF THE INVENTION

It is an object of this invention to utilize the electrode potential of metals used in the fishing lure to radiate electric waves in the water habitat of the fish and to simultaneously produce acoustical waves in the water. The electrode potential or difference of electrical potential between a metal and its solution of normal ionic concentration in which it is immersed is shown in Table 1.

| Metal | Ion | Potential Dif. |
|---|---|---|
| Gold | Au'' | +0.985 |
| Platinum | Pi'' | +0.985 |
| Silver | Ag'' | +0.799 |
| Mercury | Hg | +0.793 |
| Copper | Cu | +0.347 |
| Lead | Pb | −0.132 |
| Tin | Sn | −0.146 |
| Nickle | Ni | −0.20 |
| Iron | Fe | −0.34 |
| Zinc | Zn | −0.770 |

A contoured longitudinal strip of metal, in this instance copper, is designed to flutter when agitated by movement through the water. The fluttering movement will cause the copper strip to collide with an associated non-fluttering zinc strip suspended from the same fixture as the copper strip. The frequency of collisions determined by the size, weight, contouring of the copper strip and the velocity with which it traverses through the These two dissimilar metal electrodes separated by an electrolyte may be so arranged that the emf is not merely transitory but may remain fairly constant while current is delivered to an outside load. Such an arrangement is called a voltaic cell. In the instant invention the electrodes flutter from a separated position to contact momentarily. The water and the minute spacing between the electrodes at contact acting as an electrolyte in which the electrodes generate an electrical pulse. The effectiveness of the water electrolyte varies from fully ionized salt water to almost pure fresh water. The agitation of the water as the lure moves through the water plus the mechanical impacts greatly reduces the polarization loss of the electrodes.

The flutter induced impact between the electrodes produces sonic waves in the water the frequency of which is a function of the shape, size, and weight of the electrodes and the velocity at which the lure moves through the water.

DETAILED DESCRIPTION OF THE PREFERRED EMBODIMENT

Figure 1:
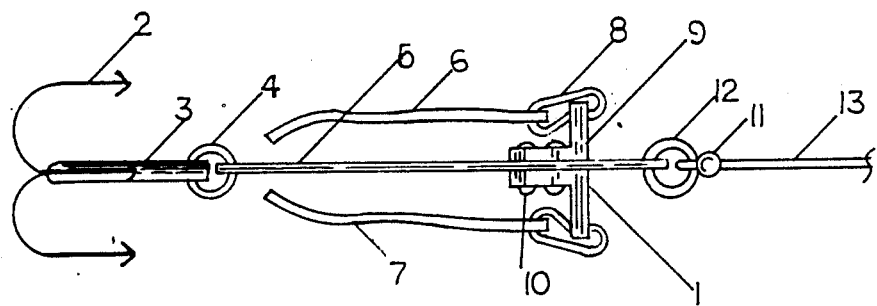
FIG. 1 is a plan view of one form of the electro-acoustical fishing lure.
Figure 2:
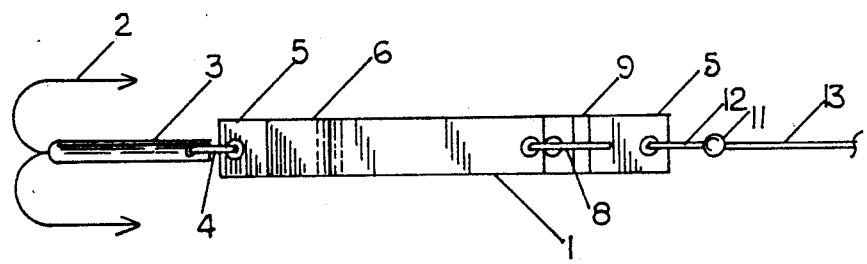
FIG. 2 is a side elevation of the electro-acoustical fishing lure.

FIG. 1 is a plan view of one form of the electro-acoustical fishing lure 1, showing the fluttering electro-acoustical fishing lure electrodes 6 and 7 configured to produce a fluttering movement when suspended parallel to the fixed electrode 5. The fish-hook assembly 2 and 3 is shown attached to one end of the fixed electrode by ring 4, and the other end of the 12. The fluttering electrodes are attached to the fixed electrode by insulator fitting 9 by rings 8, and the electrodes are attached to the insulator by rivets 10.

In use, movement through the water of the fishing lure induces a fluttering movement of the flexible attached electrodes causing intermittent collisions between moving electrodes and the fixed electrode introducing a flow of metallic ions through the water electrolyte which constitutes an electric current flow between the fluttering electrodes and the fixed electrode.

The metal to metal impact between the electrodes simultaneously introducing acoustical waves into the water.

I claim:

1. An electroacoustical fishing lure incorporating a plurality of metal strips of different electrode potential configured to flutter to make momentary contact between electrodes as the lure moves through the water comprising:
    (a), a first longitudinal strip of electrode material with a hook assembly attached to one end;
    (b), the distal end of said electrode attached to the fishing line;
    (c), a second and third strip of electrode material having a different electrode potential configured to flutter as they are moved through the water;
    (d), the second and third strip of electrodes loosely supported parallel to and on each side of the first electrode;
    (e), the second and third electrodes electrically insulated from the first electrode by an insulating support element; whereby the fluttering of said electrodes causes current producing pulses as they make momentary contact; and the metal to metal impact between the electrodes producing acoustical waves emanating into the water to attract fish.

2. An electro-acoustical fishing lure as described in claim 1 wherein the improvement further comprises:
    (a) the first fixed electrode made of zinc; and,
    (b) the second and third fluttering electrodes made of copper.

* * * * *